Figure 3:
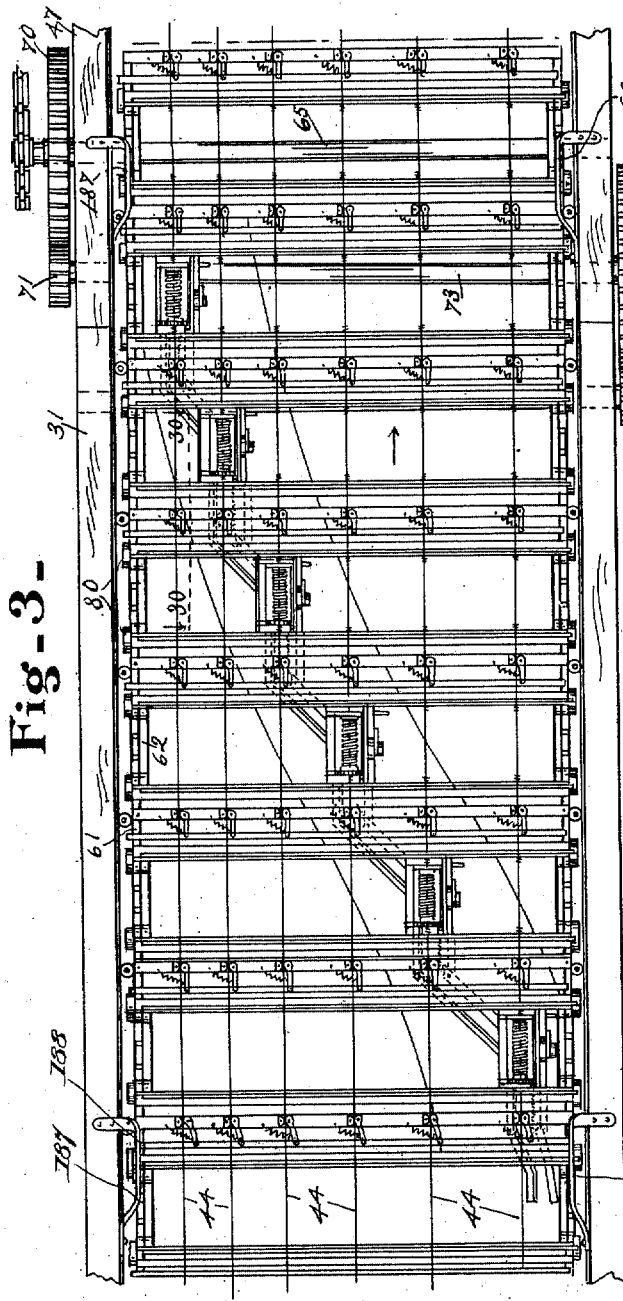

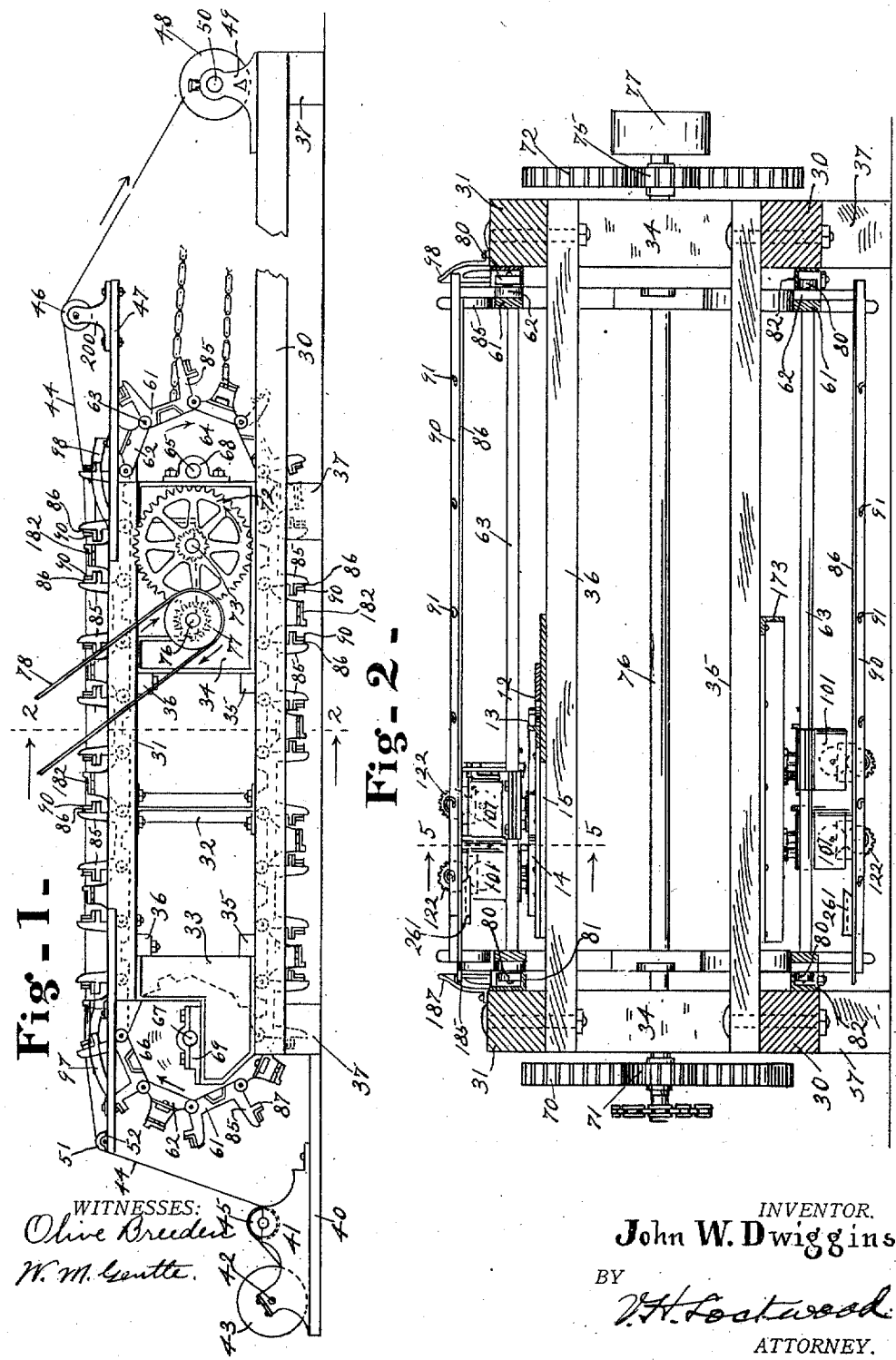

J. W. DWIGGINS.
WIRE FABRIC MAKING MACHINE.
APPLICATION FILED OCT. 9, 1907.

983,985.

Patented Feb. 14, 1911.
10 SHEETS—SHEET 2.

WITNESSES:
Olive Breeden
W. M. Gentle.

INVENTOR.
John W. Dwiggins.
BY
V. H. Lockwood
ATTORNEY.

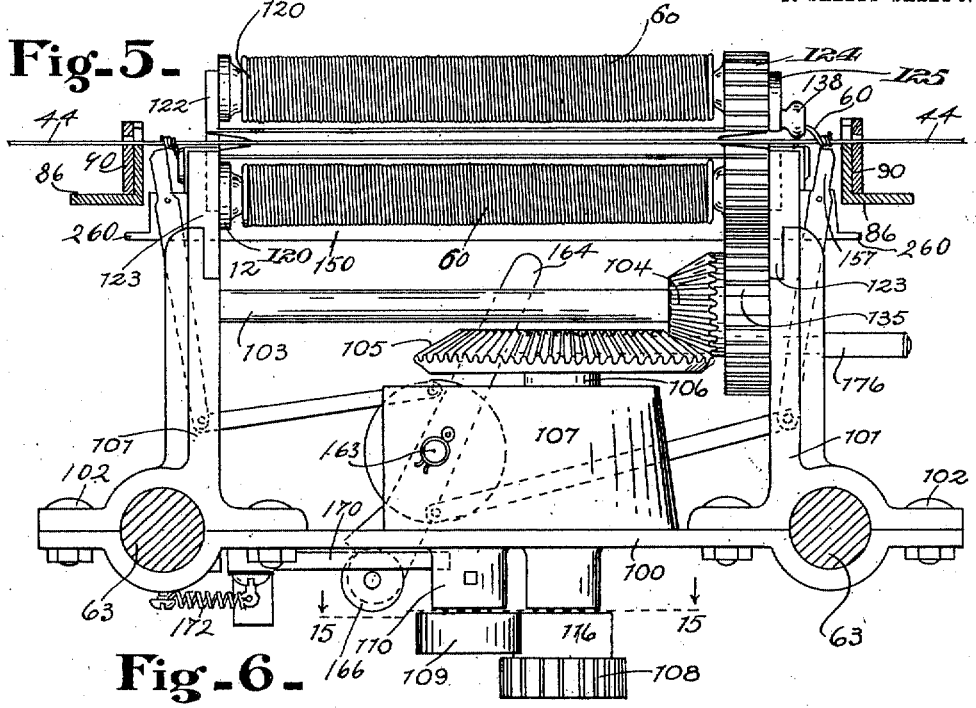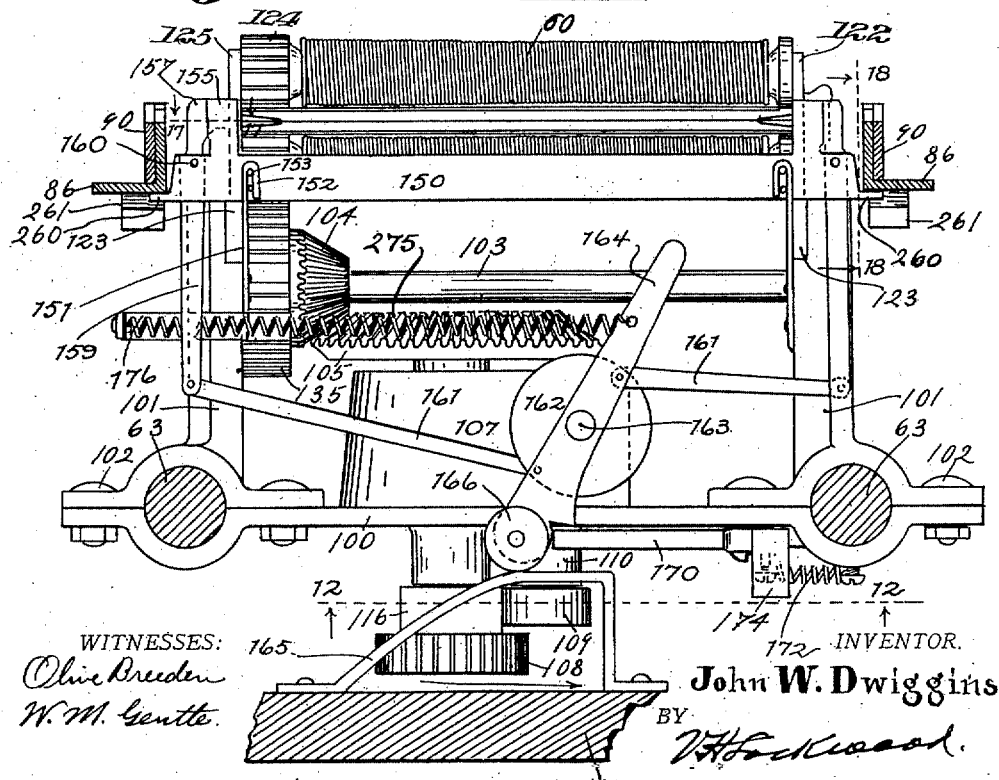

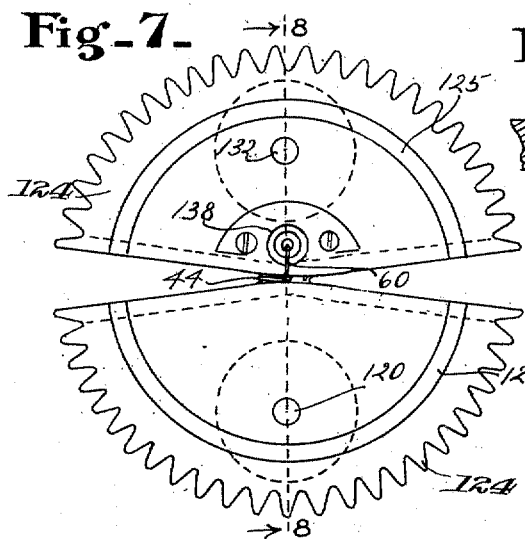
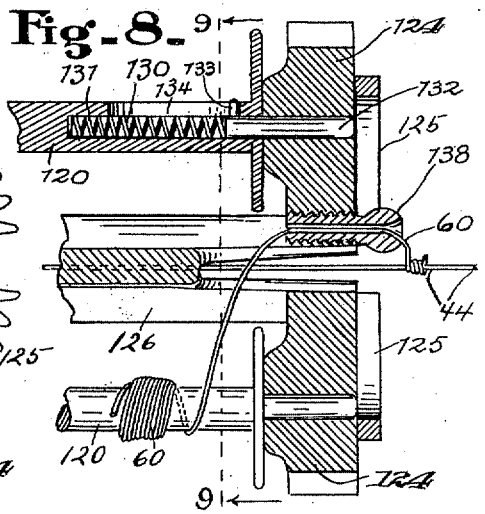
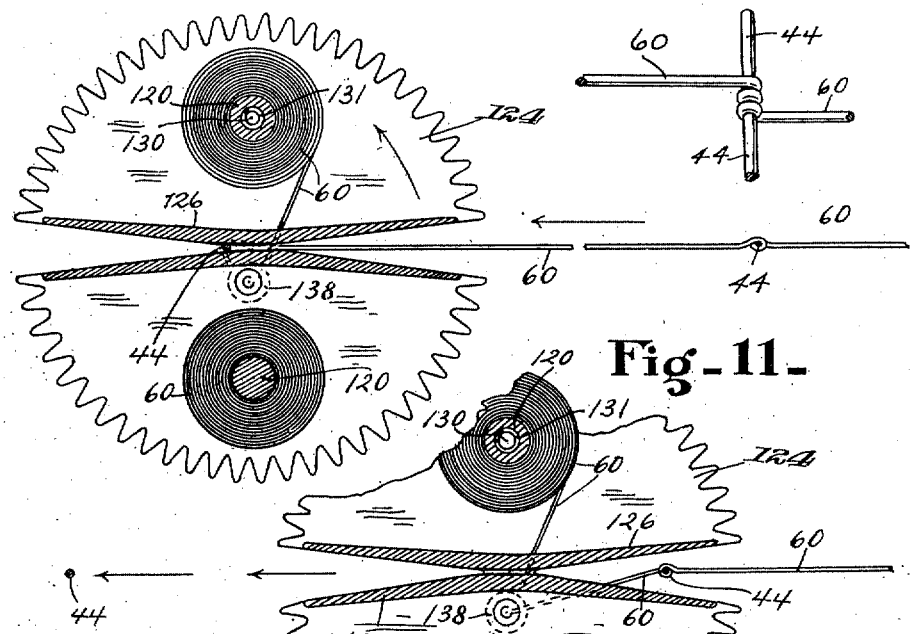
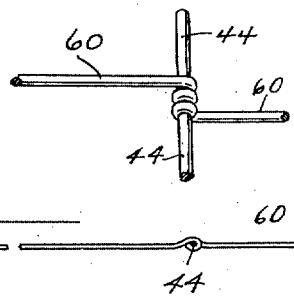

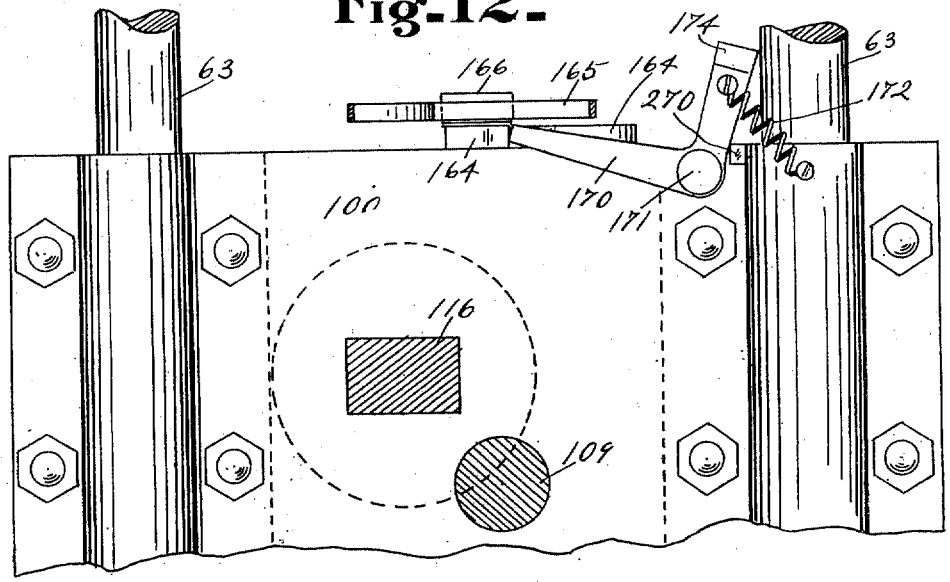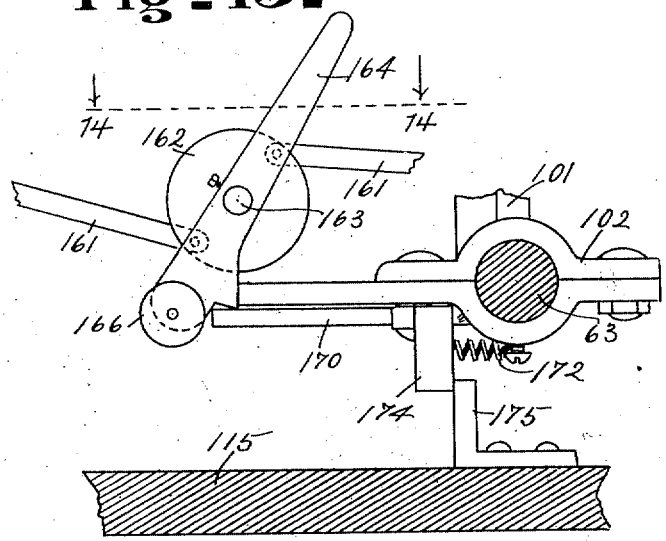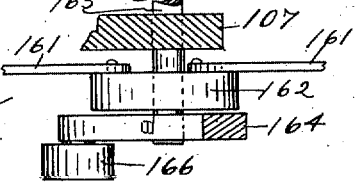

J. W. DWIGGINS.
WIRE FABRIC MAKING MACHINE.
APPLICATION FILED OCT. 9, 1907.
983,985.
Patented Feb. 14, 1911.
10 SHEETS—SHEET 6.
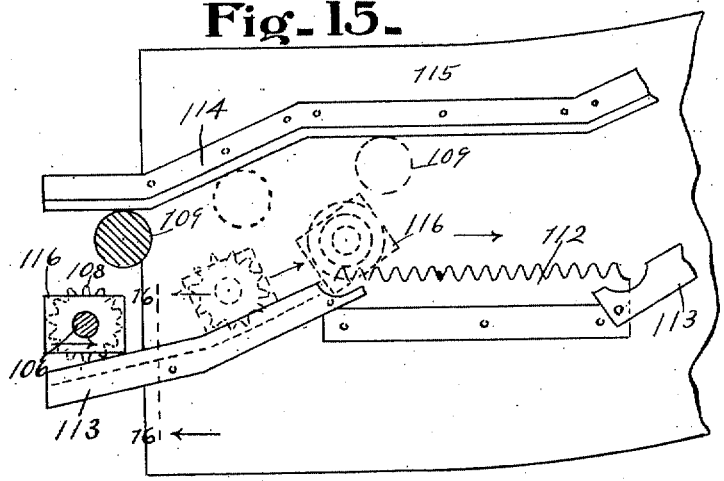
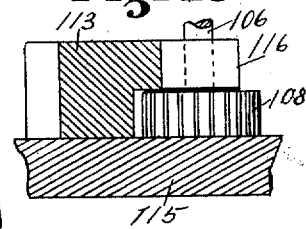
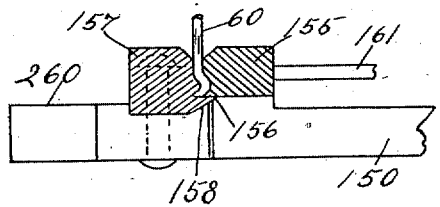
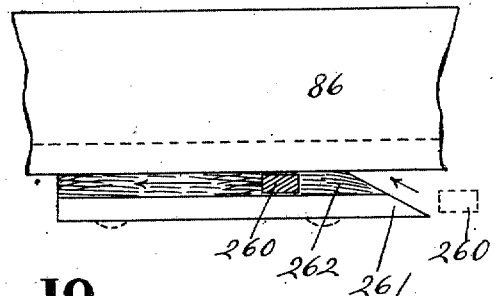
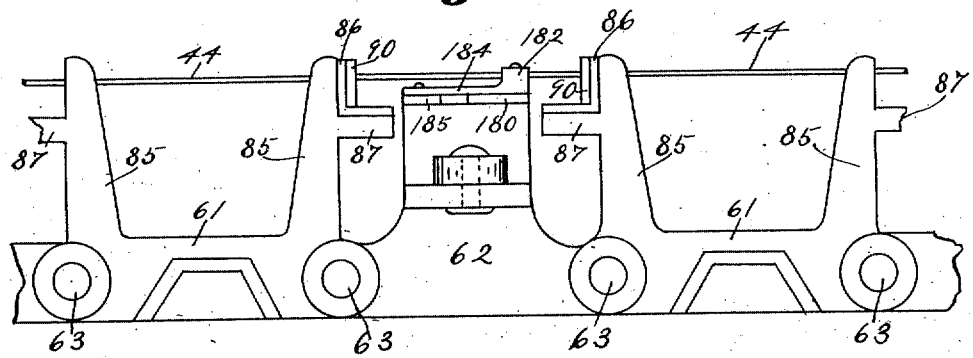
WITNESSES:
Olive Breeden
W. M. Gentle
INVENTOR.
John W. Dwiggins
BY
V. H. Lockwood
ATTORNEY.

J. W. DWIGGINS.
WIRE FABRIC MAKING MACHINE.
APPLICATION FILED OCT. 9, 1907.
983,985.
Patented Feb. 14, 1911.
10 SHEETS—SHEET 7.
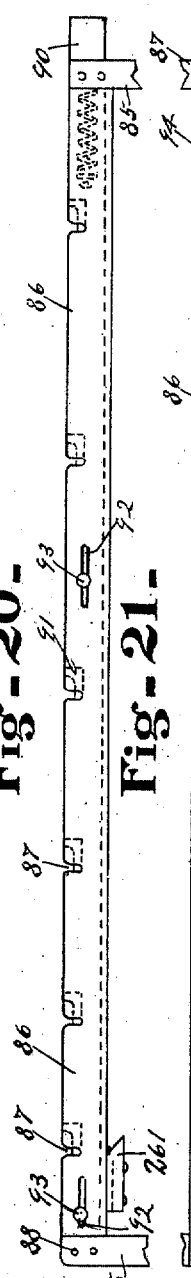
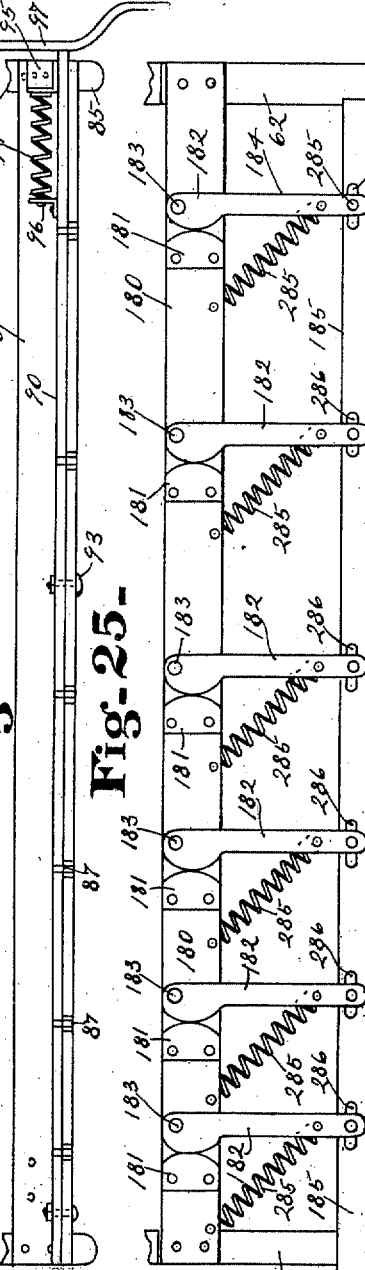
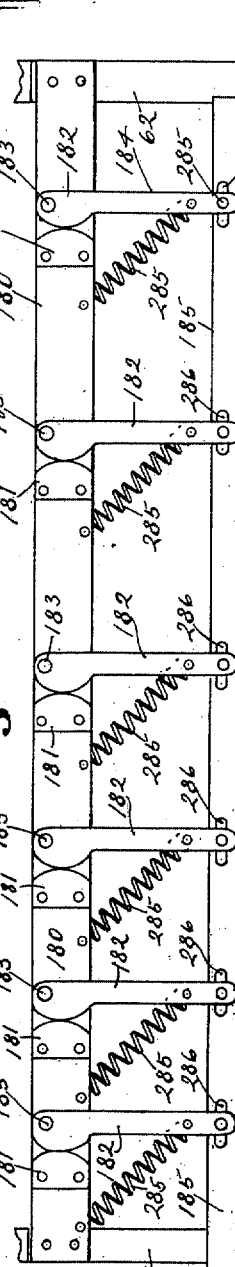
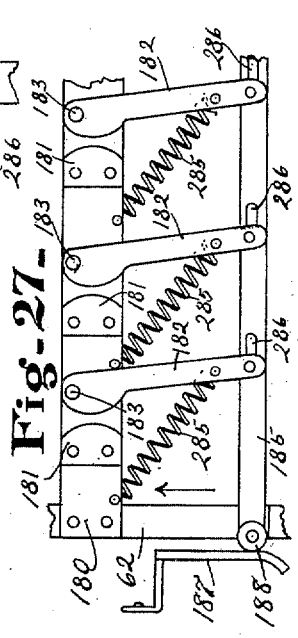
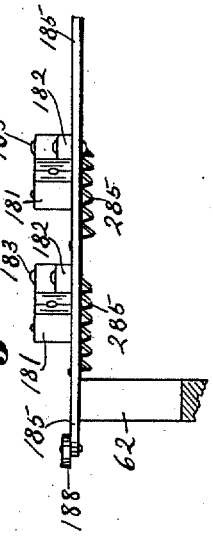
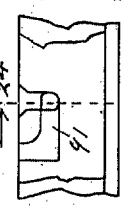
WITNESSES:
Olive Breeden
W. M. Gentle
INVENTOR.
John W. Dwiggins
BY V. H. Lockwood
ATTORNEY.

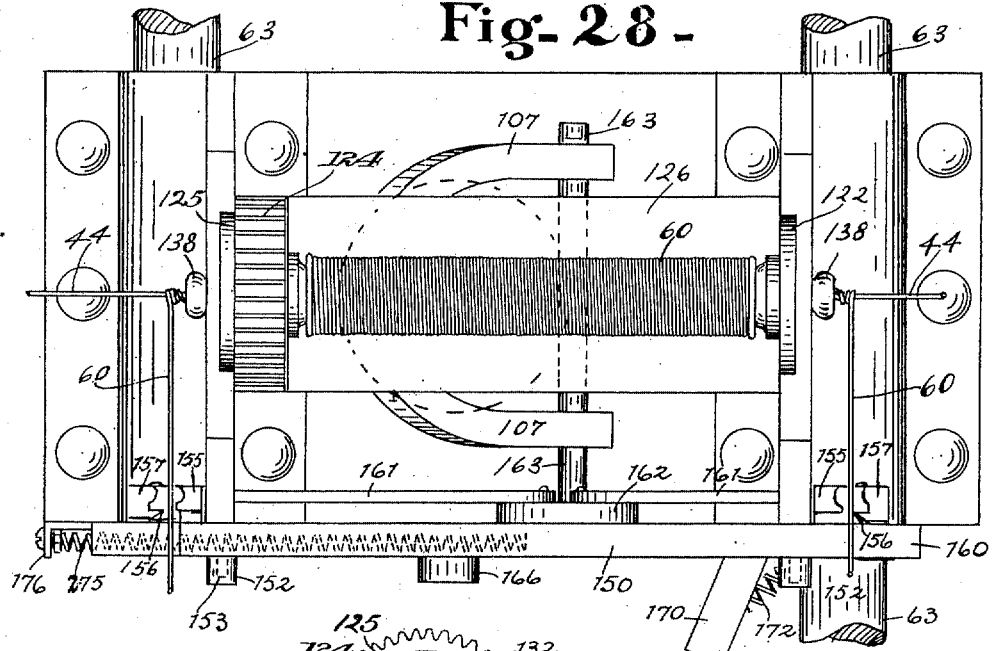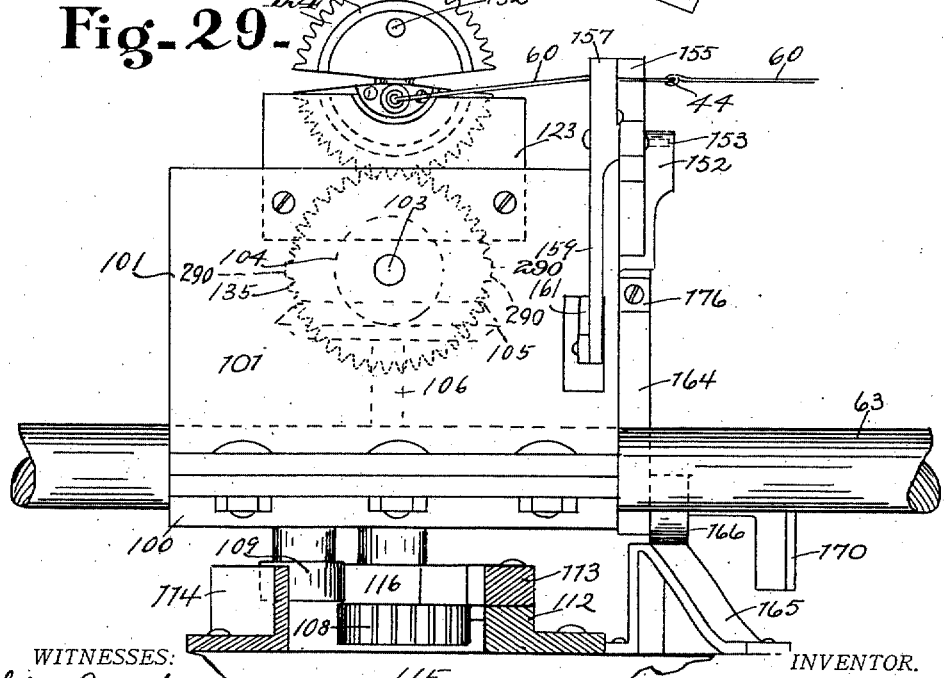

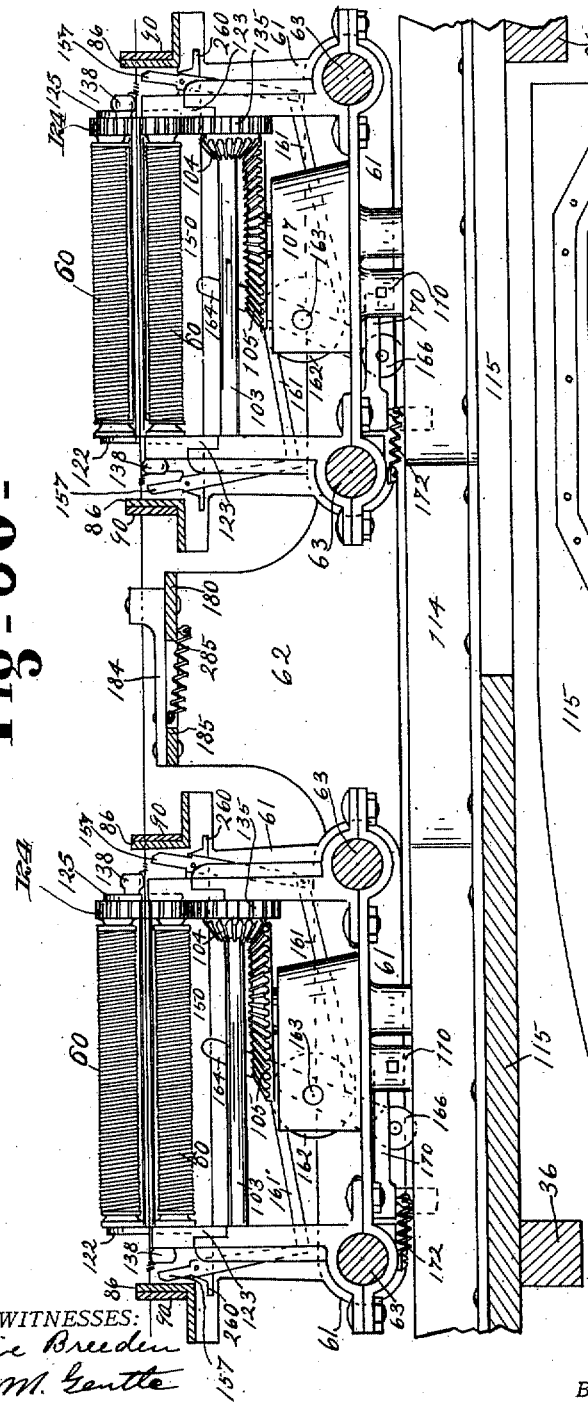

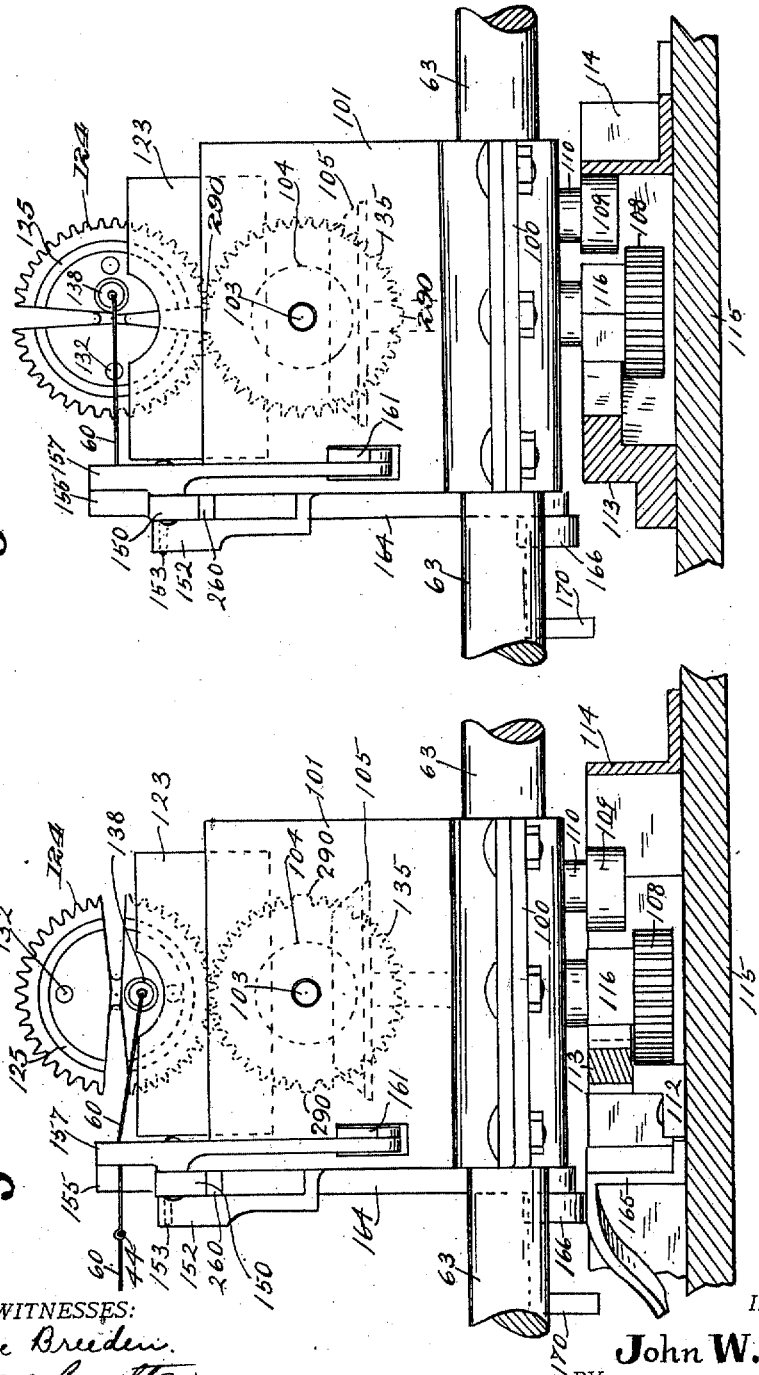

UNITED STATES PATENT OFFICE.

JOHN W. DWIGGINS, OF MUNCIE, INDIANA, ASSIGNOR TO ALLEN C. SHIMER, OF ANDERSON, INDIANA.

WIRE-FABRIC-MAKING MACHINE.

983,985.      Specification of Letters Patent.      Patented Feb. 14, 1911.

Application filed October 9, 1907. Serial No. 396,549.

*To all whom it may concern:*

Be it known that I, JOHN W. DWIGGINS, of Muncie, county of Delaware, and State of Indiana, have invented a certain new and useful Machine for Making Wire Fabric; and I do hereby declare that the following is a full, clear, and exact description thereof, reference being had to the accompanying drawings, in which like letters refer to like parts.

The object of this invention is to provide a machine for making woven wire fabric, particularly what is known as wire farm fence, with considerably increased speed and capacity as compared with former machines.

One feature of this invention resides in the idea of weaving cross wires with longitudinal wires of the fabric by a weaving device that moves along with the longitudinal wires. To that end I provide an endless carriage that continuously moves the longitudinal wires longitudinally and I mount the weaving device on said carriage so it will travel therewith and means are also provided for giving to said weaving device a movement transversely of the carriage whereby, as it moves along with the longitudinal wires, it will move transversely of them and weave cross wires with them. This simultaneous and continuous longitudinal and transverse movement of the weaving device causes it to pursue a course diagonal of the machine. Hence, along with the foregoing feature of invention, there is the further improvement of providing a zigzag track diagonally of the machine for guiding the movements of said weaving device. Alternate portions of said track extend diagonally of the machine for guiding said weaving device transversely and all of the longitudinal wires in succession and alternate intermediate portions of said track that are parallel with the longitudinal wires along which portions said weaving device moves while weaving cross wires with the longitudinal wires. In the longitudinal portions of the track means are provided for actuating the weaving device.

Another feature of my invention consists in providing an endless carriage with means for gripping and moving the longitudinal wires of the fabric while said gripping device is moving along the upper part of the machine. Included in this is the idea of continuously moving the weaving device and the means for gripping and holding the longitudinal wires longitudinally of the machine across the top and back along the bottom thereof to the beginning of the weaving movement, so that there is an inclined guide way on the upper part of the machine for guiding the weaving device diagonally of the machine during the weaving processes and another for returning it diagonally along the bottom side of the machine until it again reaches the starting point.

My invention also includes the idea of providing a plurality of said weaving devices in connection with said endless carriage, preferably more than twice as many weaving devices as longitudinal wires, whereby there will always be one weaving device at all times operating in connection with each longitudinal wire, so that if there be six or twelve longitudinal wires in the fabric being woven, there will be six or twelve weaving devices simultaneously weaving stay wires with the longitudinal wires. In this way great speed and capacity is obtained as the stay wires can be woven with the longitudinal wires as rapidly as the longitudinal wires can be moved through the machine. In connection with the foregoing said endless carriage is provided with a number of transversely extending pairs of rods on each pair of which a weaving device is slidably mounted and so it may be slid longitudinally of said transverse rods and transversely of the machine.

Another feature of the invention, and a very important one, consists in providing a spool holder in the weaving device that has longitudinal slots for the longitudinal wires, which slots are located on opposite sides of the center of the spool holder, and in that connection means for revolving the spool holder a number of revolutions and one-half of a revolution more, so that the weaving device may be readily shifted from one longitudinal wire to the next and will be in position to disengage one longitudinal wire and to receive the next one, and by this means the weaving device, although it extends above the longitudinal wires, may be moved transversely of the series of longitudinal wires without any difficulty. In this connection means are provided for maintaining the spool holder in each weaving device in a certain position, preferably with the said slots horizontal while being shifted from one longitudinal wire to the next.

Another feature of the invention consists in providing a weaving device that will weave simultaneously two cross wires with the longitudinal wires. To that end two spools carrying two cross wires are mounted in each weaving device, one spool weaving a cross wire at one side of the device and the other spool weaving a cross wire at the other side of the device. Along with the foregoing there is provided transversely extending bars for guiding the longitudinal wires, the weaving device being located between said guide bars and movable transversely of the machine between them, whereby each cross wire will be coiled on the longitudinal wires near the bars for guiding the strand wires. In connection with the foregoing a pair of guiding bars is provided with means for opening and closing the holding slots for receiving the longitudinal wires as said holding bars are carried by the endless carriage up to the longitudinal wires and for releasing the said longitudinal wires as said holding bars are moved downward from said longitudinal wires. In connection with the foregoing, means are provided for normally holding and guiding the longitudinal wires over the machine.

Another feature consists in providing means along with each weaving device for cutting off the cross wires from the spools after they have been coiled about the series of longitudinal wires and for holding the ends of the cross wires until after the beginning of the coiling of a new set of cross wires about the longitudinal wires. Means are also provided for giving the spool holder in each weaving device a quarter turn after it has left the last longitudinal wire, so the spools therein will be readily accessible for removing and replacing the same; and also means are provided before the beginning of the weaving process at the other end of the machine for giving the spool another quarter of a turn to bring it to the right position for the first longitudinal wire of the series.

It is observed that, after the longitudinal wires have been started in this machine it is entirely automatic in its various operations, excepting that new spools of cross wires must be inserted as rapidly as the progress of the work demands.

Figure 4:
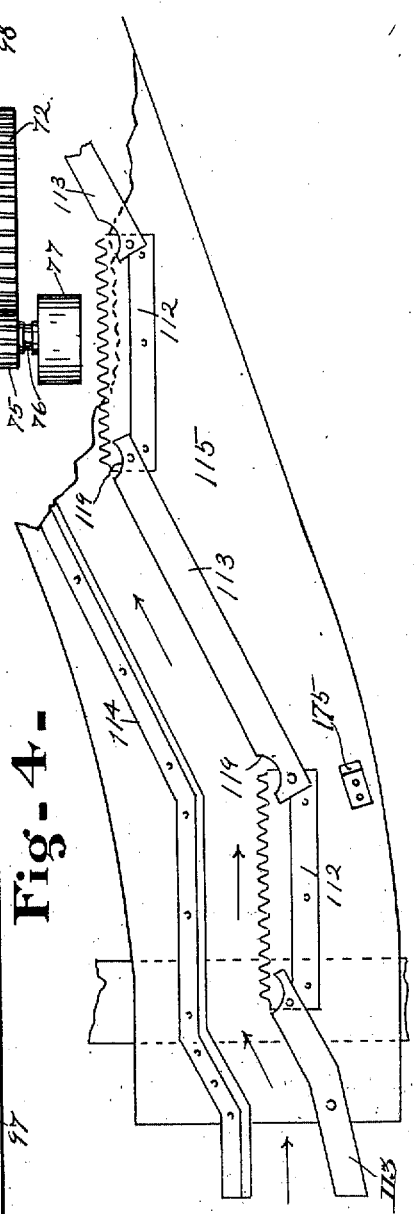

The foregoing and other features of my invention will be understood from the accompanying drawings and the following description and claims:

In the drawings forming a part hereof Figure 1 is an elevation of the right hand side of a small machine adapted to make a six strand fabric, parts being broken away. Fig. 2 is a vertical transverse section thereof on the line 2—2 of Fig. 1, some parts however being removed. Fig. 3 is a plan view of said machine with the ends thereof broken away and the lower parts and driving mechanism not being shown. Fig. 4 is a plan view of the zigzag guide way at the beginning or the left hand end of Fig. 3, it being shown upon an enlarged scale and parts being broken away. Fig. 5 is an elevation of the right hand side of a weaving device with the parts in their normal positions, the parts of the machine in connection with which said weaving device is mounted being in vertical section longitudinally of the machine. Fig. 6 is an elevation of the left hand side of what is shown in Fig. 5 with the mechanism for cutting off and holding the ends of the stay wires in operated and locked position, and the means for actuating said cutting off mechanism being shown in vertical section of the machine, parts being broken away. Fig. 7 is an elevation of the right hand end of the spool carrying means as it appears in Fig. 5. Fig. 8 is a vertical section longitudinally of the spool holding mechanism on the line 8—8 of Fig. 7, parts being broken away. Fig. 9 is a section on the line 9—9 of Fig. 8. Fig. 10 is a perspective view of a joint between the strand wire and stay wire of the fabric being made by this machine. Fig. 11 is the same as Fig. 9 with parts broken away and showing the same in its position during the shifting of the weaving device from one strand wire to the next. Fig. 12 is a horizontal section on the line 12—12 of Fig. 6 showing a bottom view of a portion of the weaving mechanism, parts being broken away. Fig. 13 is a detail of the means for locking the mechanism for cutting off and holding the stay wires, substantially the same as it is shown in Fig. 6, excepting that it is shown in connection with the means for releasing said locking mechanism, said latter means being shown in a vertical section longitudinally of the machine. Fig. 14 is a section on the line 14—14 of Fig. 13, showing the parts in plan view. Fig. 15 is a plan view of the beginning of the zigzag guide way for the weaving devices, and parts of a weaving device being shown on the line 15—15 of Fig. 5 in full lines in the entering position and in dotted lines in the advanced position. Fig. 16 is a vertical section on the line 16—16 of Fig. 15. Fig. 17 is a horizontal section on the line 17—17 of Fig. 6. Fig. 18 is a vertical section on the line 18—18 of Fig. 6, and transversely of the machine. Fig. 19 is a side elevation of a portion of the endless carriage and a strand wire, parts being broken away. Fig. 20 is an elevation of a pair of the strand wire holding bars and the means in which they are mounted, the latter partly broken away and the holding bars being in their normal position. Fig. 21 is a plan view of what is shown in Fig. 20. Fig. 22 is the same as Fig. 21 with the movable holding bar shifted so that the notches therein will register with the notches in the stationary holding bar. Fig. 23 is an elevation of the reverse side of a portion of the bars shown in Fig. 20 and on a somewhat larger scale. Fig. 24 is a transverse section on the line 24—24 of Fig. 23. Fig. 25 is a plan view of the strand wire gripping bars in their gripping position. Fig. 26 is a vertical section on the lines 26—26 of Fig. 25, showing the parts in elevation. Fig. 27 is a plan view of one end of what is shown in Fig. 25 and the means for releasing the gripping mechanism, parts being broken away. Fig. 28 is a plan view of the weaving device with a spool holder in the position it occupies when it is ready to leave one longitudinal wire and be moved to the next. Fig. 29 is an end elevation of the weaving device with the parts in the same position, there being also shown the guide way in cross section for guiding and actuating said weaving device. Fig. 30 is a longitudinal section through the upper part of the machine near one side thereof on the line 30—30 of Fig. 3, showing the three links of the carriage and the parts carried thereby associated. Fig. 31 is a plan view of the zigzag guide way for the weaving devices at the starting or left hand end of the device as viewed in Fig. 1, the various positions of the means for guiding and actuating the weaving device being shown by dotted and full lines as they enter said guide way. Fig. 32 is a side elevation of the weaving device and vertical cross section of the zigzag guide way at the point just after the spool holder has left the last longitudinal wire in the series and when the cross wire is being cut off. Fig. 33 is the same, showing the parts moved slightly further along the course of the machine on the upper side after the spool holder has been given a quarter turn and the parts being in condition to pass over the end and along under the machine to return to the weaving position at the front end of the machine.

The machine which is shown in the drawings for the purpose of illustrating the general nature of my invention is provided with a rectangular frame, consisting of the lower side bars 30, the upper side bars 31, the vertical iron columns 32 and iron frames 33 and 34 intermediate the upper and lower side bars, and the cross bars 35 located at intervals on the lower side bars 30 and the cross bars 36 secured at intervals to the under side of the top side bars 31. The lower side bars 30 are mounted on blocks 37. At one end of the frame just described on the base 40 frames 41 are provided for mounting the rod 42 on which reels 43 are placed containing the longitudinal strand wires 44. These strand wires pass from the reels 43 about the tension pulleys 45 mounted likewise in the frames 41 and thence longitudinally over the roller 51 on the arms 52 projecting from the forward end of the frame and the fabric when woven passes over the elevated roller 46 mounted on the arms 47 extending rearward from the rear end of the machine and thence to the reel 48 mounted on the arms 49 upon which the fabric is wound. The strand wires 44 are drawn over the machine by the reel 48, the shaft 50 of which is actuated by the chain 53. The details of the reel actuating mechanism are not here shown as the same may be of any well known type, and I do not wish to limit my invention to any particular means for actuating the reel 48 or drawing the strand wires and fabric across the machine.

The machine here shown is adapted to make a fence with six longitudinal wires but it is thus shown for convenience in making the drawings, as ordinarily such fences would have about twelve strand wires and therefore the machine for manufacturing it would need to be wider and longer than that here shown. In other words, I do not wish the invention to be limited to a machine of any particular size or capacity.

As the strand wires pass over the machine, the transverse stay wires 60 are wound about said strand wires by means that will now be explained. There is a stay wire weaving mechanism for winding each stay wire in place that is substantially as shown in Figs. 5 to 11, and mounted on a peculiarly constructed endless carriage consisting of side links 61 and 62 arranged alternately with each other on each side of the machine and pivoted together by heavy cross rods 63. This makes substantially a pair of endless sprocket chains, one at each side of the machine, the two chains being connected by the pivot rods 63; and the stay wire weaving mechanism is mounted transversely slidable on each pair of said pivot rods, as will hereafter be explained. The endless carriage referred to is mounted on hexagonal sprocket wheels 64 secured to the shaft 65 and the sprocket wheels 66 mounted on the shaft 67. The shaft 65 is mounted in the bearings 68 secured to the frame 34, while the shaft 67 is mounted on bearings 69 secured upon horizontal portions of the castings 33, as appears in Fig. 1. Said carriage is actuated by power applied to the shaft 65 by means of the gear 70 on said shaft that meshes with the pinion 71 on the shaft 73 and which is actuated by gear 72 and the pinion 75 secured on the shaft 76 which carries the driving pulley 77 that is driven by belt 78 that runs from some suitable source of power. The shafts 76 and 73 are mounted upon horizontal portions of the castings 34. The wheels 66 at the other end of the machine are idlers.

On each end of each rod 63 there is a wheel 80 that rides upon an angle iron track 81 that extends horizontally and longitudinally of the machine in the upper part thereof; and at the under side of the machine said wheels 80 run in the similar guide ways 82. These tracks or guide ways 81 and 82 guide and hold the endless carriage very accurately so as to permit the same to have longitudinal movement and prevent the lateral play or movement thereof.

Each link 61 consists of a body portion that has for its function not only the formation of the socket like carriage or chain referred to, but it also has two oppositely located upwardly and outwardly extending arms 85 adapted to carry the transversely extending bars 86. As seen in Figs. 20 to 24 this bar 86 is made of angle iron and therefore consists of two portions at a right angle to each other and said right-angled bar rests upon horizontal projections 87 from the arms 85 that extend at a right angle therefrom, as seen in Fig. 19 and the vertical portion of the bar 86 is secured by rivets or bolts 88, see Fig. 20, to the vertical portions of the arms 85. Each of said transverse guide bars 86 is provided with V-shaped notches 87 in its upper edge, said notches being arranged at the same distances from each other as the strand wires of the fabric, so that said strand wires will lie in said notches when said cross bars are traveling across the upper part of the machine. Said bars 86 are not movable longitudinally of themselves nor transversely of the machine but move longitudinally of the machine along with the endless carriage referred to. To prevent the escape of the strand wires from the notches 87 in said bars 86, a companion bar 90 is mounted beside the vertical portion of the bar 86 and rides upon the horizontal portion thereof, as seen in Fig. 24. This vertical bar is provided with slots 91 with vertical mouths or openings and with a horizontal portion and at such distances apart as will enable them to register with the notches 87 in the bar 86, see Figs. 20 to 24. A longitudinal slot 92 is provided in the bar 90 so that the pin 93 fastened in the bar 86 may project loosely through said slot and serve to guide and limit the longitudinal movement of the bar 90. Said bar 90 is held in its normal position by the spring 94 that is fastened to the plate 95 secured on the horizontal portion of the bar 86 at one end and to the plate 96 secured to the side of the bar 90, as shown in Fig. 21. That spring normally holds the bar 90 at its right hand limit of movement, as shown in Figs. 20, 21 and 23. Said bar 90 is longitudinally actuated by the cam plates 97 and 98, one at each end of the machine, see Fig. 3, and when thus actuated the mouths of the notches 87 and 91 in the two bars 86 and 90 register with each other, as shown in Fig. 22. This position of the parts is obtained as these guiding bars move upward over the wheels 66 and come in contact with the strand wires and enables said strand wires to enter both of said slots, and then as the endless carriage moves farther the bar 90 escapes from the cam plate 97 and the spring 94 draws said bar to the position shown in Figs. 20, 21 and 23, so that the strand wires cannot escape from said guide and holding bars during the travel thereof over the upper part of the machine. When said bars 86 and 90 reach the other end of the machine and start down over the wheels 64 then the cam 98 moves the bar 90 to the position shown in Fig. 22 and permits all the strand wires to escape the grip of the bar 90.

As stated before, there is an individual device for weaving each transverse stay wire with the strand wires and said device travels with the strand wires and the fabric as a whole through the machine. Each stay wire weaving device, as shown in Figs. 5 to 11, is mounted transversely slidable upon a pair of pivot rods 63 and said pivot rods form a part of the endless carriage so that these weaving devices travel with and are moved by the carriage and that is the chief function of the endless carriage. There is likewise a set of strand wire guiding bars 86 and 90 located substantially over each pivot rod 63 and parallel therewith, as seen in Figs. 2 and 5, and between each pair of which a weaving device is located so that the holding bars 86 and 90 will hold the strand wires in close proximity to the sides of the weaving device. It may also be stated that this weaving device simultaneously unites two transverse stay wires with the strand wires, there being one stay wire put on at each side of the weaving device and in close proximity to the strand wire holding bars.

Each weaving device consists of a rectangular frame, formed, as herein shown, of the bottom plate 100, and vertical side plates 101 held together by bolts 102 and each end provided with semi-circular grooves so that, registering, they form a tube through which pivot rods 63 extend loosely, and the device as a whole may ride along on a pair of said pivot rods 63. There is, therefore, one of these weaving devices between each oppositely located pair of links 61 in the endless carriage and preferably two more than double the number of strand wires in the fabric being made. Thus, in the machine shown fourteen weaving devices are required to make a six strand fence, because six of these weaving devices must be uppermost in actuating position all of the time, one for each strand wire, and there will be, therefore, six of them on the under side and one at each end. I have shown a machine for making only a six wire fence, but I do not wish it to be limited as a twelve wire fence is more usual and for making twelve wire fences twenty-six of these weaving devices are required.

The end plates 101 of each weaving device carry a shaft 103 which holds them at the proper distances apart and said shaft carries a bevel pinion 104 meshing with the horizontal bevel gear 105 on the vertical shaft 106 in the bearing block 107 on the bottom plate 100. A horizontal gear 108 is secured on the lower end of shaft 106 beneath the plate 100 and there is also a rectangular block 116 secured on the shaft 106 over said wheel 108. There is also a friction wheel 109 mounted in the sleeve 110 extending down through the bottom plate 100. Gear 108 is so located on the under side of plate 100 that in traveling over the upper side of the machine it will engage the racks 112 that form a part of a zigzag track extending diagonally of the machine on the upper portion thereof, as shown in Figs. 3 and 4. Said rack bars 112 are mounted upon the plate or board 115 that extends diagonally of the machine and rests upon the upper cross bars 36. Said rack bars 112 are located exactly parallel with a longitudinal line through the machine and therefore with the strand wires when they are in place, and there is one of these rack bars 112 under each strand bar and consequently under the path followed by the notches 87 and 91 in the bars 86 and 90. Inclined guide bars 113 extend from one rack bar 112 to the next one and above the same so as to be on a higher plane and in a position to be engaged by the holding block 116 while the weaving device is passing over the portion of said zigzag track represented by the bars 113 in the direction of the arrows in Fig. 4. Besides said rack bars 112 and guide bars 113, there is a guide bar 114 arranged with sections opposite to and parallel with said rack bars 112 and other sections opposite to and parallel with said guide bars 113 and in position to be engaged by the friction wheel 109. As the weaving device is moved along over the zigzag track, said wheels 108 and 109 and block 116 extend down in the path between the rack bars 112 and guide bars 113 on one side and the guide bar 114, on the other side. So that said friction wheel 109, bearing against the inner surface of the guide bar 114 will hold the gear 108 in mesh with the rack bar 112 and will hold the block 116 in engagement with guide bar 113, whereby the weaving device will be operated while it is passing over the rack bar 112 and therefore in line with the strand wires and will not operate while passing from one rack to the next one and therefore from one strand wire to the next one.

The function of block 116 is to hold or lock the spool carrying mechanism in place while the weaving device is being moved over from one longitudinal wire to the next so that the spool holder will properly approach the longitudinal wire toward which it is moving, as in Fig. 11. Hence, block 116 slides along in engagement with guide bars 113 until the gear 108 strikes the rack bar 112. Then the block 116 revolves along with the gear. The notches 119 in the bars 113 are to permit the block 116 to turn as gear 108 starts on or leaves the rack bar 112.

After the weaving device has passed along the upper part of the machine and woven in its cross wires and at the time it leaves the longitudinal wires turning downward therefrom at the rear end of the machine, the V-shaped slots in the spools must be vertical, to permit the longitudinal wires to escape therefrom. But while the weaving device is passing along under the machine and up over the front end thereof to begin an operation, it is desirable that the spool holder be given a quarter turn to put the V-shaped slots in a horizontal position in order that the spools may be readily removed or inserted as they become empty. Therefore, the last guide bar 113 in the zigzag guide way, see Fig. 15 is bent somewhat so that it will turn the block 116 sufficiently to cause a quarter turn of the spool holder. Likewise, when the weaving device has moved up over the front end of the machine and started upon its upper horizontal course, the first guide bar 113 is also bent, see Fig. 15, so that it will act on the block 116 in such manner as to give the spool holder a quarter turn back to its vertical position in order that it may receive the longitudinal wire for the next operation.

Each weaving device carries two spools 120 on each of which wire 60 is wound. These spools are at one end mounted in the disk 122 on the opposite sides of the center thereof, and said disk has bearing in a semicircular recess in the upper part of the bearing plate 123 that is secured to the upper part of the side plates 101. At the right hand end, as shown in Figs. 5 and 8, said spools 120 have bearing in the large disk 124 that is provided peripherally with teeth and on its side surface has an annular flange 125 that has bearing in the bearing plate 123, the same as at the other end of the device. This enables the two spools to be revolved, as the two disks 122 and 124 are connected by an intermediate, longitudinally extending connection 126. This connecting bar or means, as shown in Fig. 9, has double forks from near the center thereof outward radially so that there is a narrow V-shaped groove on diametrically opposite sides of the center of said spool mechanism and corresponding V-shaped openings in the disks 122 and 124 so that the longitudinal strand wire 44 may enter and lie in one of said V-shaped grooves, as shown in Figs. 7 and 8, during the twisting of the stay wire 60 about said strand wire. The spools 120 are removably mounted, as shown in Fig. 8, as each spool is provided with a recess 130 centrally in the end thereof for the spring 131 and the sliding spindle 132 that is held outward by said spring and the outward movement of the spindle by the spring is limited by the pin 133 on said spindle, which pin projects through the slot 134 in the spool. By pushing the spindle 132 inward, the spool may be removed.

The spool gear 124 meshes with the gear wheel 135 on the shaft 103, as shown in Fig. 5. Therefore, as the weaving device travels along the straight portion of the zigzag path so that the gear 108 meshes with the rack bar 112, the pair of spools will be revolved about the center of the mechanism on which the spools are mounted, that is, the longitudinal center of the connecting bar 126 which is parallel with and near the strand wire 44 lying in one of the grooves thereof. Hence, during such revolution of the pair of spools, two stay wires 60 will be coiled about the strand wire. The wire on the two spools is separate and passes from each spool through an eye or perforated piece 138 secured in the plate or gear 122 at a point on the opposite side of the strand wire from the spool off which the stay wire is drawn, so that as the spool mechanism is revolved, the stay wire will be coiled about the strand wire. The stay wire from one spool leads through the eye 138 at one end of the weaving device, while the stay wire from the other spool leads through a similar eye 138 at the other end of the weaving device, whereby two parallel stay wires are woven with the strand wires by said weaving device simultaneously, as indicated in Fig. 5.

The means for actuating the spools in the machine herein shown is arranged to give the same two and one-half turns, whereby the stay wire will be coiled about the strand wire two and one-half times, as shown in Fig. 10. This makes a very firm union but the gear may be arranged so as to make a greater or less coil.

From the foregoing, it is seen that as each weaving device is carried from the under side upward over the left hand end wheels 66, as appears in Fig. 1, the downwardly projecting wheels 108 and 109 and block 116 from said weaving device will enter the zigzag guide way, as shown in Fig. 15. About the same time the strand wire holding bar 90, shown in Fig. 20, will be actuated to the position shown in Fig. 22, so that the strand wires will enter the notches 87 and 91. On the further movement of the weaving device by the carriage, the gear 108 at the bottom of the weaving device will meet the first rack bar 112 and coil stay wires 60 around the nearest strand wire, shown in Fig. 3. Simultaneously with this coiling, the weaving device is carried along for the length of the rack bar 112 and likewise the strand wires are simultaneously and with the same speed and by the same ultimate driving mechanism moved longitudinally along the device.

After the stay wires have been coiled two and one-half times, the weaving device will be moved diagonally by the guide bars 113 and 114 on the zigzag track to the second strand wire, the first strand wire having escaped from the narrow V-shaped slot in the spool holding mechanism as said mechanism is moved laterally away therefrom, as indicated in Fig. 11. The rack bar mechanism is of such length as to cause the spool holding mechanism to revolve only two and one-half times, so that the V-shaped grooves will always be left in a horizontal position, as shown in Figs. 7, 9 and 10. Hence, said spool holding device moves to the left, as shown in Fig. 11 away from the one strand wire to the next one. In this manner the strand wires enter the V-shaped slots automatically, one after the other. Thus, two stay wires are coiled successively about the strand wires beginning at the nearest one shown in Fig. 3 and continuing until the farthest one is reached, the strand wires moving along all the time at the same speed as the weaving device so that when the weaving device has moved entirely across the top of the machine in the zigzag direction indicated, it will have woven two stay wires transversely across the strand wires at exact right angles therewith. Since there is on the upper side of the machine always as many weaving devices as strand wires, there will be always one weaving device in engagement with one strand wire when the weaving device has reached the rack bars 112 and all of said weaving devices will be simultaneously actuated for coiling the stay wires about the strand wires and simultaneously moved from one strand wire to the next one. Hence, in the machine shown there will always be six weaving devices coiling simultaneously twelve stay wires about the strand wires, and in a full size machine for making a twelve wire fence there will be twenty-four stay wires being put on simultaneously and at all times. This makes the capacity of the machine very great and in fact weaves the fence as fast as it can be drawn through the machine and by making the machine comparatively heavy and strong the movement of wire fence fabric through the machine may be at a considerable speed and for this reason, the capacity of the machine, it is believed, far exceeds any one previously devised for making fence or wire fabric of this general character. It is necessary, however, that there shall be mechanism to cut off the stay wires after they have have been wound about all the strand wires and to hold the cut ends thereof until the weaving device has passed entirely under the machine and has reached the top of the machine and started to weave and has been coiled about the first strand wire, for unless the end of the stay wire be held while the spool mechanism revolves about the first strand wire, it is obvious that the stay wire would not coil on the strand wire. As soon as that coil is completed, the stay wire holding means is released and remains in a state of inactivity until the cutting off period has been reached. That mechanism will now be described.

There is a cutting and holding mechanism mounted on each end of each weaving device, as shown in Fig. 5, so that when the time comes it will cut off and hold each of the two stay wires being carried by the one weaving device. On one longitudinal side of each weaving device, see Fig. 6, there is a loosely mounted plate 150, the ends of which lie between the bearing pieces 123 and the vertical bars 151 that are secured to the inner surfaces of the side plates 101 and the bearing plates 123. The upper ends of said bars 151 are turned down at 152 to form a vertical guide way for a pin 153 that projects loosely into the slot thus formed and thereby the vertical movements of the plate 150 are guided and the upward limit thereof maintained. Upon the upper side of the bar 150, near each end, there is a stationary combined knife and holding block 155, see Figs. 6 and 17, that has a knife edge at 156. This coöperates with a corresponding movable knife and holding block 157 that has a knife edge 158 that coöperates with the knife edge 156, so that when they are brought into engagement with the wire 60, the wire will be cut and held firmly, as shown in Fig. 17. To enable the wire to be tightly held, the faces of said blocks 155 and 157 are curved somewhat to kink the wire. The movable knife and holding block 157 is mounted on the upper end of the lever 159 that is fulcrumed at 160 on the bar 150 and to the lower end of said lever there is a pivoted bar 161 that runs to and is pivoted eccentrically to the disk 162 which is mounted on a pin 163 secured to the casting 107. The connecting bars 161 from the cutting off and holding mechanism on two sides of the weaving device are pivoted at diametrically opposite points to the disk 162 and said disk is actuated by a rocking bar 164 that is secured on said spindle 163 and is actuated by a cam plate 165 located on plate 115 of the frame of the machine, and friction wheel 166 being mounted on said rocking bar 164 to engage with said cam plate. Said cam plate is engaged by the wheel 166 as the weaving device is moved longitudinally through the machine toward the end of the operation, that is, immediately after the stay wires have been coiled about the last strand wire and when the rocking lever 164 is thus actuated, as shown in Fig. 6, it throws both connecting bars 161 outwardly or endwise which causes the knives and holding blocks to be operated for cutting off the ends of the stay wires and holding the same. As soon as the rocking bar 164 is operated thus, as shown in Fig. 6, a locking trip bar 170 is moved laterally into engagement with the lower end of the bar 164 so as to hold it in that locked position while the weaving device goes down the rear end of the machine and back under the machine and up over the front end of the machine. This locking trip 170 is shown in Figs. 6, 12, 13 and 14 and it is in the form of a bell crank lever fulcrumed on the pin 171 in the under side of the plate 100 of the weaving device and is sprung into engagement by the spring 172 extending from said plate 100 to said trip lever, as soon as the rocking bar 164 has been actuated far enough to let the end of the trip bar 170 slip behind it, as shown in Fig. 6. A stop 270 limits the return movement of lock 170. But, in order to bring the knife and the holding blocks up in position to engage, cut off and hold the stay wires, it is necessary to elevate them and the plate 150 from the position indicated in Fig. 5 and which is the normal position, to the position shown in Fig. 6. This elevation of the cutting off and holding mechanism is accomplished by extensions 260 on the ends of the plate 150 riding up over the inclined ends of the plates 261 on the under side of each strand wire holding bar 86. This plate 261 is located near the left hand end of each of said bars so that they will be engaged only when the stay wires are being coiled about the last strand wire. This block is shown in detail in Fig. 18 where it is seen to have an inclined forward edge and a groove 262 in it which the end 260 of the plate 150 enters so that the ledge in the surface of the block 261 thus formed will support temporarily the cutting off and holding mechanism. After the said mechanism is locked by the locking trip 170 there is no further need of the elevating blocks 261.

After each weaving device has woven its pair of stay wires with the strand wires, it passes down over the right hand wheel 64 and is moved horizontally back to the front and during such longitudinal movement of the weaving device, it is gradually shoved over from the left hand side of the machine, as shown in Fig. 2, to the right hand side, by the diagonally extending guide bar 173 that is secured on the under side of the cross bars 35 of the frame. This bar 173 is a piece of angle iron that is engaged by the friction wheel 109 which during said movement, extends upward from the weaving device, as shown in Fig. 2.

When the weaving device has reached the forward end and the other side of the machine, it passes up over the left hand wheel 66, as shown in Fig. 1 and begins weaving the stay wires again with the strand wires, and as the stay wires are coiled about the first strand wire, their ends are still held by the holding mechanism which has been described. About the time the first coil of the stay wires is completed the end 174 of the locking lever 170 engages the finger 175 on the plate 115, as shown in Figs. 4 and 13, which disengages said locking means and releases the rocking bar 164 which is withdrawn by the spring 275 connecting said bar 164 with the end of the bar 176 and that spring through the bars 164, 161, 159 releases the wire holding mechanism until the cutting off time again arrives.

The means for gripping and drawing the strand wires through the machine will now be explained. Referring to Figs. 19, 25, 26 and 27, it will be observed that upon each opposite pair of link members 62 there is secured transversely of the machine a plate 180 having at proper intervals thereon stationary holding blocks 181 and movable holding blocks 182. These latter holding blocks are fulcrumed on pins 183 and are integral, as here shown, with arms 184, whereby the movable blocks 182 are moved away from the stationary blocks 181, as shown in Fig. 27, so as to let the strand wires in between said holding blocks and are movable together in gripping position, as shown in Fig. 25. Each set of holding blocks is located the same distance from each other as the strand wires, and each holding block 182 and its lever 184 is held in gripping position by the spring 285 that runs diagonally from the rear end of the bar 184 to a point at the left hand thereof on the plate 180, as shown in Fig. 25. This gives to each set of holding blocks independence and an individuality of tension to accommodate each set of holding blocks to grip the particular wire between them, regardless of the size of the wires between the other sets of blocks. With this construction some longitudinal wires may be used in a fabric that are larger than the other longitudinal wires therein.

The gripping blocks 182 are released from their gripping positions by the bar 185 which is pivotally connected with the rear ends of the bars 184 by means of pins 285' in bars 184 projecting through longitudinal slots 286. Said bar 185 is moved transversely of the machine by the cam plate 187 which is secured to the frame of the machine, as seen in Figs. 3 and 27. Rollers 188 are placed on the ends of the bar 185 to engage said cam. There is a cam plate 187 at each end of the machine, so that this gripping mechanism may be opened as it travels up to the longitudinal wires at the front end of the machine in order to receive and grip said wires and also be opened at the rear end of the machine in order to release said wires before the gripping mechanism starts to move downward.

Attention is called to the fact that the roller 46 is held in an elevated position on posts 200, at the rear end of the machine, as shown in Fig. 1, so that the fabric will not catch the upwardly projecting portions of the endless carriage, such as arms 85, after the longitudinal wires of the fabric have been released by the gripping mechanism. Also attention is called to the fact that the spool holders are so formed as illustrated in Figs. 7 and 8, that the longitudinal wire 44 will issue centrally from the end of the spool holder at the point of coiling the cross wire therewith, while between the ends of the spool holder, as shown in Fig. 9, the longitudinal wire is not central. This centering of the longitudinal wire is caused by the guide bar 86 and is permitted by the deep V-shaped slot in each end of the connecting portion 126 of each spool holder. Therefore, each longitudinal wire is exactly in the center of a circular path of the eye or part 138 as it revolves. This materially contributes to the successful coiling of the cross wires on the longitudinal wires. Furthermore, gear 135, see Fig. 5, has on diametrically opposite sides two double teeth 290 to mesh with the mouths of the V-shaped slots in the gear or disk 122.

What I claim as my invention and desire to secure by Letters Patent is:

1. A machine for making wire fabric, including a frame, a carriage, endless means movable longitudinally of the machine for moving said carriage, means for supporting the longitudinal wires of the fabric above said frame, means on said carriage for gripping and holding the longitudinal wires while said carriage is moving above the frame, a device in connection and movable with the carriage for weaving cross wires with the longitudinal wires, and means for causing said weaving device to move transversely to the longitudinal wires in succession.

2. A machine for making wire fabric, including means for longitudinally moving the longitudinal wires of the fabric continuously, a device mounted in connection with said means movable therewith for weaving cross wires with the longitudinal wires, and a guide-way for causing said weaving device to move transversely to all of the longitudinal wires successively.

3. A machine for making wire fabric, including means for longitudinally moving the longitudinal wires of the fabric, a device mounted in connection with said means for weaving cross wires with the longitudinal wires while the longitudinal wires are moving, and means for guiding said weaving device alternately in longitudinal and diagonal directions whereby it can unite the cross wires with the longitudinal wires while moving longitudinally and will pass from one longitudinal wire to another while moving diagonally.

4. A machine for making wire fabric, including means for longitudinally moving the longitudinal wires of the fabric, a device mounted in connection with said means for weaving cross wires with the longitudinal wires while the longitudinal wires are moving, and a guide-way for guiding the direction of movement of said weaving device, which guide-way is composed of alternate longitudinally and diagonally extending sections, the longitudinal sections of said guide-way being parallel with the longitudinal wires.

5. A machine for making wire fabric, including an endless carriage movable longitudinally of the machine, means thereon for holding the longitudinal wires of the fabric whereby they will be moved along the machine, a plurality of devices mounted on said carriage and movable therewith for weaving cross wires with the longitudinal wires, there being one of said weaving devices with each longitudinal wire and means for causing said weaving devices to move transversely of the longitudinal wires in succession.

6. A machine for making wire fabric, including an endless carriage movable longitudinally of the machine, means thereon for holding the longitudinal wires of the fabric whereby they will be moved along the machine, a device mounted on said carriage and movable therewith for weaving a plurality of independent cross wires simultaneously with the longitudinal wires and means for causing said weaving means to move transversely to the longitudinal wires in succession.

7. A machine for making wire fabric, including a revoluble spool holder having oppositely located radial slots to receive the longitudinal wire, and means for moving said device from one longitudinal wire to the next one, whereby the spool holder may escape from one longitudinal wire and receive the next one in its slot without the rotation thereof during the said shifting movement of the weaving device.

8. A machine for making wire fabric, including a revoluble spool holder having oppositely located radial V-shaped slots to receive the longitudinal wire, and means for moving said device from one longitudinal wire to the next one, whereby the spool holder may escape from one longitudinal wire and receive the next one in its V-shaped slots without the rotation thereof during the said shifting movement of the weaving device.

9. A machine for making wire fabric, including a revoluble spool holder with a place near the center thereof for receiving a longitudinal wire, and means for moving said spool holder from one longitudinal wire to the next in a direction at a right angle to a plane through the centers of the two spools.

10. A machine for making wire fabric, including a revoluble spool holder with a place near the center thereof for receiving a longitudinal wire, means for moving said spool holder from one longitudinal wire to the next in a direction at a right angle to a plane through the centers of the two spools, and means for holding said spool holder with the spools in said position during said shifting movement.

11. A machine for making wire fabric, including a revoluble spool holder having oppositely located radial slots to receive the longitudinal wire, means for moving said device from one longitudinal wire to the next one, whereby the spool holder may escape from one longitudinal wire and receive the next one in its slot without the rotation thereof during the said shifting movement of the weaving device, and means for holding said spool holder with said slots thereof during the shifting movement in substantially the same plane as the longitudinal wires.

12. A machine for making wire fabric, including a weaving device for weaving a cross wire with the longitudinal wires of the fabric having a spool holder for holding a spool containing a cross wire, and means mounted on said device for cutting off the cross wire, after it is woven.

13. A machine for making wire fabric, including a weaving device for weaving cross wires with the longitudinal wires of the fabric having a holder for a spool, a spool mounted therein and carrying a wire for forming cross wires in the fabric, and means mounted on the device for holding the end of the wire left on the spool after it has been cut from a cross wire woven in place.

14. A machine for making wire fabric, including means for holding the longitudinal wires, a revoluble spool-holder mounted in connection with said means movable transversely thereof for weaving cross wires with said longitudinal wires, means for causing said weaving means to move transversely to the longitudinal wires in succession, and means for revolving said spool holder a number of revolutions and one-half a revolution more, whereby said spool holder may readily be moved transversely from one longitudinal wire to the next.

15. A machine for making wire fabric, including means for holding the longitudinal wires, a spool holder mounted in connection with said means and transversely movable thereon for weaving a cross wire with said longitudinal wires, said spool holder having slots longitudinally thereof on opposite sides of the center for said longitudinal wires, and means for revolving said spool holder a number of revolutions and one-half of a revolution more, whereby said spool holder may readily be moved transversely from one longitudinal wire to the next.

16. A machine for making wire fabric, including a weaving device having a revoluble spool holder with a place near the center thereof to receive a longitudinal wire, two spools mounted in said holder on opposite sides of the center for holding cross wires, and an eye eccentrically located in each end of the spool holder through which the wires from the spools respectively pass, the eye for each spool being on the side of the center of the spool holder opposite said spool.

17. A machine for making wire fabric, including means for holding the longitudinal wires, a spool transversely movable thereon for weaving a cross wire with said longitudinal wires, said spool having slots longitudinally thereof on opposite sides of the center for said longitudinal wires, means for revolving said spool a number of revolutions and one-half of a revolution more, whereby said spool may readily be moved transversely from one longitudinal wire to the next, and means for giving the spool holder a quarter turn after it has left the last longitudinal wire in the series, whereby the spools will be in a horizontal plane to render them accessible.

18. A machine for making wire fabric, including an endless carriage, means thereon for holding the longitudinal wires, a weaving device movable transversely of the carriage carrying a revoluble spool holder having a number of slots longitudinally thereof on opposite sides of the center, means for revolving said spool holder a number of revolutions and one-half a revolution more, whereby said spool holder may readily be moved transversely from one longitudinal wire to the next, and means for giving the spool holder a quarter turn more after it has left the last longitudinal wire of the series, whereby the spools will be in horizontal plane and accessible while passing back to position in connection with the first longitudinal wire of the series, 19. A machine for making wire fabric, including an endless carriage, means thereon for holding the longitudinal wires, a weaving device movable transversely of the carriage carrying a revoluble spool holder having a number of slots longitudinally thereof on opposite sides of the center, means for revolving said spool holder a number of revolutions and one-half a revolution more, whereby said spool holder may readily be moved transversely from one longitudinal wire to the next, means for giving the spool holder a quarter turn more after it has left the last longitudinal wire of the series, whereby the spools will be in horizontal plane and accessible while passing back to position in connection with the first longitudinal wire of the series, and means for giving the said spool holder another quarter turn as it approaches the first longitudinal wire of the series and bring the slot in said spool holder in position to receive said first longitudinal wire.

20. A machine for making wire fabric, including an endless carriage formed of two oppositely located sprocket like chains made up of two sorts of links alternating with each other, means transversely connecting the pairs of one form of said links for carrying the device for weaving cross wires with the longitudinal wires, and means connecting the pairs of the other form of links for holding the longitudinal wires of the fabric.

21. A machine for making wire fabric, including an endless carriage formed of two oppositely located sprocket-like chains made up of two sorts of links alternating with each other, a pair of pivot rods transversely connecting the pairs of one form of said links, a device for weaving cross wires with the longitudinal wires that is slidably mounted on each pair of said pivot rods, and means connecting each pair of the other form of links for holding the longitudinal wires of the fabric.

22. A machine for making wire fabric, including an endless carriage formed of two oppositely located sprocket-like chains made up of two sorts of links alternating with each other, means transversely connecting the pairs of one form of said links for carrying a device for weaving cross wires with the longitudinal wires, a weaving device mounted on said connection, and means on each side of the weaving device and carried by said links for guiding the longitudinal wires.

23. A machine for making wire fabric, including an endless carriage formed of two oppositely located sprocket-like chains made up of two sorts of links alternating with each other, a pair of pivot rods transversely connecting the pairs of one form of said links, a device for weaving cross wires with the longitudinal wires that is slidably mounted on each pair of said pivot rods, and means extending transversely of the carriage on each side of said weaving device and mounted on the same links as said pivot rods for guiding the longitudinal wires of the fabric.

24. A machine for making wire fabric, including an endless carriage formed of two oppositely located sprocket-like chains made up of two sorts of links alternating with each other, means transversely connecting the pairs of one form of said links for carrying a device for weaving cross wires with the longitudinal wires, a weaving device mounted on said connection, means on each side of the weaving device and carried by said links for guiding the longitudinal wires, and means connecting the pairs of the other form of links for holding the longitudinal wires of the fabric.

25. A machine for making wire fabric, including an endless carriage formed of two oppositely located sprocket-like chains made up of two sorts of links alternating with each other, a pair of pivot rods transversely connecting the pairs of one form of said links, a device for weaving cross wires with the longitudinal wires that is slidably mounted on each pair of said pivot rods, means extending transversely of the carriage on each side of said weaving device and mounted on the same links as said pivot rods for guiding the longitudinal wires of the fabric, and means connecting each pair of the other form of links for holding the longitudinal wires of the fabric.

26. A machine for making wire fabric, including an endless carriage formed of two oppositely located sprocket-like chains made up of two sorts of links alternating with each other, a pair of pivot rods transversely connecting the pairs of one form of said links, a device for weaving cross wires with the longitudinal wires that is slidably mounted on each pair of said pivot rods, means on the carriage for moving the longitudinal wires therewith, a stationary guide-way extending diagonally of the machine that engages said weaving device so that as the carriage moves longitudinally the weaving device will be moved diagonally of the machine and transversely of the carriage, said guide-way being formed of a continuous guiding strip having alternating diagonal and longitudinal portions and short guide bars opposite to and parallel with each inclined portion of said guide strip, longitudinally extending rack-bars opposite the longitudinal portions of said continuous guide strip, a friction wheel extending from the weaving device in engagement with said continuous guide strip, a shaft in said weaving device for actuating the same, a block secured on said shaft in position to engage said short guide bars, and a gear wheel secured on said shaft in position to engage said rack-bars, substantially as and for the purpose set forth.

27. A machine for making wire fabric, including an endless carriage formed of two oppositely located sprocket-like chains made up of two sorts of links alternating with each other, a pair of pivot rods transversely connecting the pairs of one form of said links, a device for weaving cross wires with the longitudinal wires that is slidably mounted on each pair of pivot rods, means on the carriage for moving the longitudinal wires therewith, a stationary guide-way extending diagonally of the machine that engages said weaving device so that as the carriage moves longitudinally the weaving device will be moved diagonally of the machine and transversely of the carriage, said guide-way being formed of a continuous guiding strip having alternating diagonal and longitudinal portions and short guide bars opposite to and parallel with each inclined portion of said guide strip, longitudinally extending rack-bars opposite the longitudinal portions of said continuous guide strip, a friction wheel extending from the weaving device in engagement with said continuous guide strip, a shaft in said weaving device for actuating the same, a block secured on said shaft in position to engage said short guide bars, and a gear wheel secured on said shaft in position to secure said rack-bars, the ends of said guide bars adjacent said rack-bars being cut away to receive the corners of said block and permit said shaft to turn.

28. A machine for making wire fabric, including an endless carriage formed of two oppositely located sprocket-like chains made up of two sorts of links alternating with each other, a pair of pivot rods transversely connecting the pairs of one form of said links, a device for weaving cross wires with the longitudinal wires that is slidably mounted on each pair of said pivot rods, means on the carriage for moving the longitudinal wires therewith, a stationary guide-way extending diagonally of the machine that engages said weaving device so that as the carriage moves longitudinally the weaving device will be moved diagonally of the machine and transversely of the carriage, said guide-way being formed of a continuous guide strip having alternating diagonal and longitudinal portions and short guide bars opposite to and parallel with each inclined portion of said guide strip, longitudinally extending rack-bars opposite the longitudinal portions of said continuous guide strip, a friction wheel extending from the weaving device in engagement with said continuous guide strip, a shaft in said weaving device for actuating the same, a block secured on said shaft in position to engage said short guide bars, a gear wheel secured on said shaft in position to engage said rack bars, a spool holder in said weaving device driven by said shaft, the end guide bars in the series being bent so as to slightly turn said block and shaft and give the spool holder in said weaving device a quarter turn, substantially as and for the purpose set forth.

29. A machine for making wire fabric, including a frame, an endless carriage movable over said frame longitudinally thereof, means on said carriage for holding and moving the longitudinal wires of the fabric, a device mounted in connection with said carriage that is transversely movable thereof for weaving cross wires with the longitudinal wires, a guide-way on the upper part of said frame and extending diagonally thereof for moving said weaving device to the longitudinal wires successively, and a guide bar on the under side of the machine for moving said weaving device as it returns under said machine back to the starting side thereof.

30. A machine for making wire fabric, including a device for weaving cross wires with the longitudinal wires of the fabric consisting of a bottom plate, two oppositely located end plates secured thereto, a spool holder rotatably mounted in said end plate with a gear formed on one end thereof and said spool holder slotted longitudinally to receive the longitudinal wire, a spool mounted on one side of the center of said spool holder carrying a cross wire, a vertical shaft mounted in the bottom of said weaving device, gearing for transmitting power therefrom to the geared end of said spool holder, a gear on the lower end of said shaft, means for moving said weaving device longitudinally of the machine, and a rack bar adapted to be engaged by said gear at the bottom thereof for revolving said spool.

31. A machine for making wire fabric, including a device for weaving cross wires with the longitudinal wires of the fabric containing a revoluble spool holder, a spool mounted therein carrying a cross wire so that the cross wire feeds out through the end of the spool holder, a stationary cutter mounted on the end of the weaving device, a movable cutter mounted on the end of the weaving device and operating with the stationary cutter, means for moving the weaving device longitudinally of the machine, a stationary cam-shaped bracket, and means engaged by said bracket as the weaving device moves for actuating said movable cutter.

32. A machine for making wire fabric, including a device for weaving cross wires with the longitudinal wires of the fabric containing a revoluble spool holder, spools mounted therein on opposite sides of the center thereof and carrying cross wires so that the cross wires feed out through both ends of the spool holder, a stationary cutter mounted on each end of the weaving device, a movable cutter mounted on each end of the weaving device to operate with the stationary cutter, means for moving the weaving device longitudinally of the machine, a stationary cam shaped bracket, and means engaged by said bracket as the weaving device moves that simultaneously actuates both of said movable cutters.

33. A machine for making wire fabric, including a weaving device for weaving cross wires with the longitudinal wires of the fabric, and a pair of coöperating combined cutters and holders mounted on said weaving device for cutting off and holding the end of the cross wire, one of said combined cutters and holders being movable.

34. A machine for making wire fabric, including a weaving device for weaving cross wires with the longitudinal wires of the fabric, a pair of coöperating combined cutters and holders mounted on said weaving device for cutting off and holding the end of the cross wire, one of said combined cutters and holders being movable, means mounted on said weaving device for operating said movable cutter and holder, means for moving the weaving device, and a stationary cam-shaped bracket for actuating the cutter and holder operating means.

35. A machine for making wire fabric, including an endless carriage for holding and moving the longitudinal wires, a weaving device mounted in connection therewith for weaving cross wires with said longitudinal wires, a cutter for cutting off the cross wires after the same have been woven, and means at the end of the machine for elevating said cutter, substantially as set forth.

36. A machine for making wire fabric, including an endless carriage, a device for weaving cross wires with the longitudinal wires of the fabric mounted in connection with said carriage and movable transversely thereof, a bar mounted stationary on said carriage beside said weaving device having in it notches for guiding said longitudinal wires, a movable bar mounted beside said stationary bar with catches thereon that register with the notches in said stationary bar, a spring for holding said movable bar in position to prevent the longitudinal wires from escaping from the notches in the stationary bar, and stationary means adapted to be engaged by said movable bar for moving it into position and release said longitudinal wires, substantially as set forth.

In witness whereof, I have hereunto affixed my signature in the presence of the witnesses herein named.

JOHN W. DWIGGINS.

Witnesses:
N. ALLEMONG,
OLIVE BREEDEN.